(No Model.)
W. L. DISMUKES.
BALL BEARING.
No. 556,257. Patented Mar. 10, 1896.
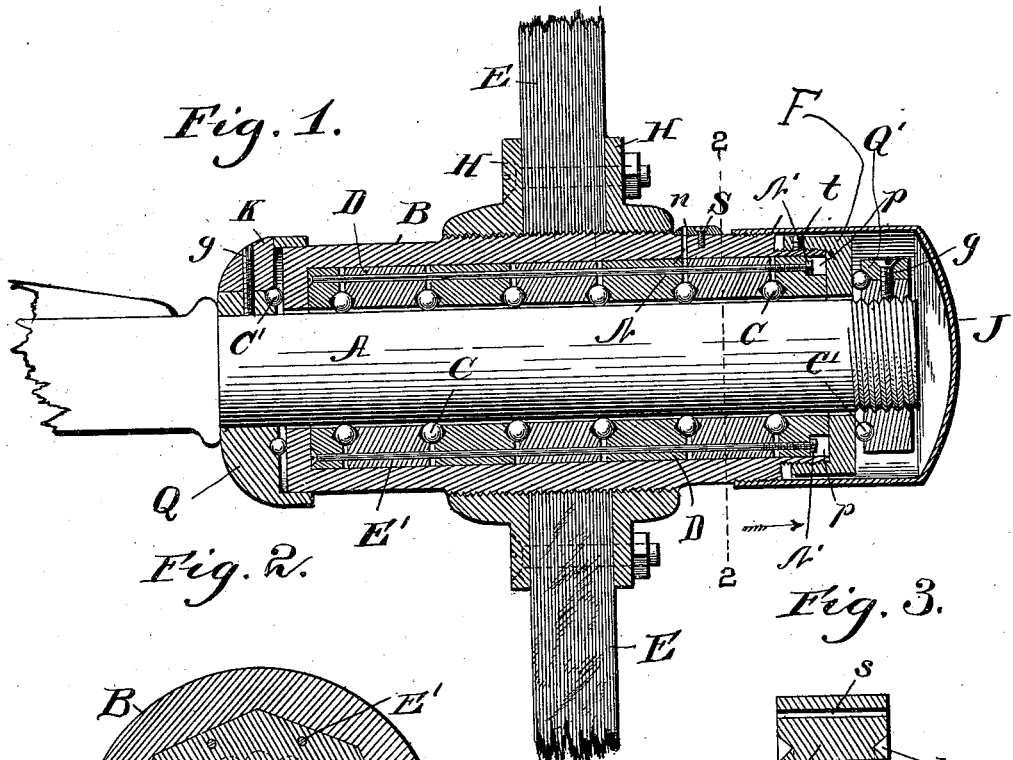
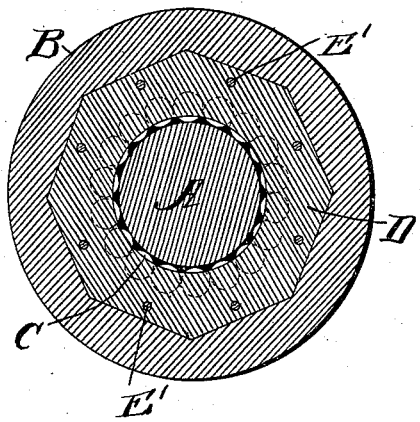
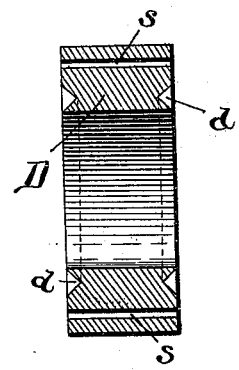
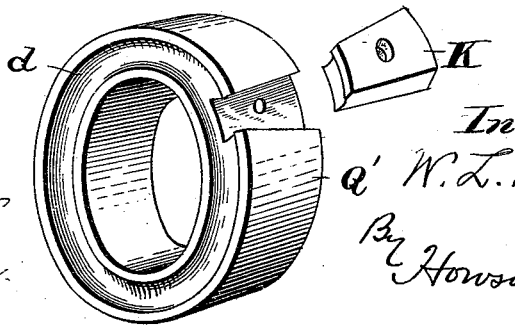
Witnesses:
J. B. McGirr.
J. P. Appleman.
Inventor:
W. L. Dismukes,
By Howson & Howson,
Attys.

UNITED STATES PATENT OFFICE.

WILLIAM LEWIS DISMUKES, OF NASHVILLE, TENNESSEE.

BALL-BEARING.

SPECIFICATION forming part of Letters Patent No. 556,257, dated March 10, 1896.

Application filed October 24, 1895. Serial No. 566,754. (No model.)

*To all whom it may concern:*

Be it known that I, WILLIAM LEWIS DISMUKES, a citizen of the United States, residing in Nashville, Davidson county, in the State of Tennessee, have invented certain new and useful Improvements in Ball-Bearings, of which the following is a specification.

My invention relates to ball-bearings for axles or shafts, and it has for its object the provision of a bearing employing spherical bodies or balls for the purpose of reducing the friction to a minimum, in which the parts are so arranged and constructed as to secure the best results with the least possible cost for construction and insuring the greatest durability.

It also has for its object the provision of a bearing which can be quickly and readily assembled and easily adjusted, so as to compensate for wear, and in general to improve the construction and operation of this class of devices.

My invention consists in the novel construction and combination of parts hereinafter described and claimed.

In the drawings, Figure 1 is a longitudinal section of my invention applied to the hub of a wheel, the axle being in elevation. Fig. 2 is a transverse section on the line 2 2, Fig. 1. Fig. 3 is a longitudinal section of one of the ball-bearing rings. Fig. 4 is a detail of one of the end nuts.

The same letters in the drawings designate corresponding parts in all of the views, in which—

A represents an ordinary axle upon which is mounted in the present instance the hub B, to which is secured the spokes E by means of the annular rims H, or in any other well-known manner. The periphery of the hub B is cylindrical, as usual, while the internal bore, which is somewhat larger than the diameter of the axle, is polygonal in contour, being shown in the present instance as octagonal, into which bore is fitted a series of bearing-rings D, whose internal diameter is slightly greater than the diameter of the axle and whose periphery conforms to the contour of the hub into which the said rings are adapted to be placed, where they are confined and held against rotation by the contacting polygonal sides on the rings and bore. These rings D loosely surround the axle or shaft and are provided with annular grooves $d$ on their abutting faces, in which grooves are seated antifriction-balls C which project beyond the internal edges of the several rings and into contact with the axle A, thus providing an antifriction support and bearing for said axle.

In order to quickly and easily assemble the several rings with their inclosed balls so that they may all be placed in the hub at the same time, I preferably perforate each of the rings at one or more points, as at $s$, and pass through said perforations rods E', provided with screw-threaded nuts N' on their ends located in recesses $p$ in the outermost bearing-ring, all of the said bearing-rings being preferably clamped together by said rods with the antifriction-balls between them before the bearing-rings are inserted in the hub. The latter is placed on the axle or shaft with the inner end fitting in the nut Q, preferably of steel, between which and the end of the hub is a series of balls C', as shown in Fig. 1. The outer end of the bearing-rings is closed by a cap F, which can be adjusted to take up the wear on the ball-bearings, and holds the rings against longitudinal movement, the said nut being held in any adjusted position by a set-screw, as $t$.

Upon the outer end of the axle is a steel nut Q' provided on its inner face with a groove in which is seated a series of balls C' bearing against the end cap F. The nuts Q Q' are provided with removable dovetail sections K, seated in recesses in the nuts and held in place by set-screws $g$ passing through the section and into the nut, which permit the introduction of the balls into their grooves when the said nuts are in position and in a proper relation to the hub and axle. This operation, it will be observed, is readily performed by removing the dovetail section and passing balls through the recesses in the nut, through which they readily pass into the groove in proper position.

The end of the hub is covered by a dust cap or cover J secured in any suitable manner on the hub so as to keep out dust from the bearings.

Upon the periphery of the hub, at a suitable point or points, I provide an oil-channel N, leading to the bearing-rings, the outer end of which channel is covered by a set-screw S with a large head having an oil-hole $n$ therethrough, which is normally kept out of register with the oil-channel N and which may be readily brought into register by turning the head of the screw by any suitable means until the hole therein and the channel properly register, the oil being introduced through the hole $n$ in the head of the screw and flowing down through the channel into the bearings.

By making the bearing-rings of polygonal form externally—octagonal, as shown in the present instance—the said rings are very strong and capable of resisting great strain without breaking, while they can be easily and cheaply manufactured. They can also be readily assembled and placed in position in the hub, in which they are more securely held and by simpler means than if they were round or cylindrical. The tie-rod serves a two-fold purpose: First, it enables the balls to be placed in the grooves of the bearing-rings before the latter are inserted in the hub, so that both balls and bearing-rings may be introduced into the hub at one operation, the rings or balls being securely locked together by the tie rod or rods; and, second, the rod assists to some extent in keeping the bearing-rings in proper position in the hub. Furthermore, it will be seen that each ring is readily removable from the group whenever it is necessary to replace it with another on account of wear without requiring a change in the rest of the group, as would be the case if the rings were formed into a permanent cage, as is the case in some constructions of this class of devices heretofore made.

While I have shown my invention applied to the hub of a wheel, it is obvious that it is equally adapted for use in other relations—as, for example, on a rotating shaft, in which case the hub will be stationary and the shaft rotating thereon.

I claim as my invention—

1. In a ball-bearing for axles and shafts, the combination with the shaft or axle, of a hub having a polygonal bore, polygonal bearing-rings loosely surrounding the axle or shaft and held against rotation by the polygonal bore of the hub, and balls confined between the abutting faces of the rings and bearing upon the axle or shaft, substantially as described.

2. In a ball-bearing for axles and shafts, the combination with the axle or shaft, of a hub having a polygonal bore, polygonal bearing-rings within the hub and loosely surrounding the axle or shaft and provided with grooves on their abutting faces, balls seated in said grooves and bearing upon the shaft or axle, an adjusting-cap on the outer end of the hub for holding the bearings against longitudinal movement and adjusting for wear, substantially as described.

3. In a ball-bearing for axles or shafts, the combination with the axle or shaft, of a hub having a polygonal bore, polygonal bearing-rings held within said bore and loosely surrounding the shaft or axle and provided with grooves on their abutting faces, balls in said grooves forming a bearing for the axle or shaft, a screw-nut on the outer end of the hub provided with a groove containing balls bearing against the end of the hub, and a screw-adjusting cap on the outer end of the hub bearing against the outer bearing-rings for holding the said ring against longitudinal movement and adjusting the same for wear, substantially as described.

4. In a ball-bearing for axles or shafts, the combination with the shaft, of the hub having a polygonal bore, polygonal bearing-rings within the bore of the hub and provided with grooves, balls confined in the grooves between the abutting faces of the rings, and one or more removable tie-rods passing through perforations in said bearing-rings and holding the said rings together, substantially as described.

5. In a ball-bearing, the combination with the axle or shaft, of a hub having a polygonal bore surrounding the axle or shaft, polygonal bearing-rings held in the bore of the hub, balls confined between the abutting faces of said rings and bearing upon the axle or shaft, one or more tie-rods passing through the rings, the head of each rod being provided with a screw-threaded nut seated in an annular recess in the outer bearing-ring, substantially as described.

6. In a ball-bearing, the combination with an axle or shaft, of a hub having a polygonal bore surrounding the axle or shaft, of ball-bearing rings provided with grooves in their abutting faces confined within said hub, balls within said grooves forming bearings for the shaft or axle, one or more tie-rods passing through the rings to hold them together, the outer ends of each rod being provided with a screw-nut seated in a recess in the outer bearing-rings, and an adjusting-cap on the outer end of the hub bearing against the outer bearing-ring, substantially as described.

7. In a ball-bearing, the combination with an axle or shaft, of a hub surrounding the same, polygonal bearing-rings confined within the bore of the hub and loosely surrounding the shaft or axle, balls confined between the abutting faces of the rings and bearing upon the shaft or axle, an adjusting-cap on the outer end of the hub bearing against the end ring, an end nut on the axle or shaft provided with a groove with balls seated therein and bearing against the end cap, the said end nut having a removable dovetail section to permit the introduction of the balls in the groove therein, substantially as described.

8. In a ball-bearing, the combination with an axle or shaft, of a hub surrounding the axle or shaft and having a polygonal bore, polygonal bearing-rings confined within the bore of the hub and loosely surrounding the shaft or axle, balls seated in grooves in the faces of the rings and bearing upon the shaft or axle, an end cap adjustably attached to the outer end of the axle and bearing against the outer bearing-ring, a nut on the shaft or axle at the inner end of the hub having a groove in its face containing balls bearing against the end of the hub, a nut secured to the axle or shaft and provided with a groove in its face containing balls bearing against the end cap, each of said nuts having removable dovetail sections to permit the introduction of the balls into the grooves, after the nuts are in place, substantially as described.

9. In a ball-bearing, the combination with the axle or shaft and the hub, of the polygonal bearing-rings seated within the hub and surrounding the axle or shaft, balls confined between the abutting faces of said rings, the cap on the outer end of the hub bearing against the end ring, and a grooved end nut bearing against the cap and provided with a removable section in its periphery to permit the introduction of the balls in the groove of said nut, substantially as described.

In testimony whereof I have signed my name to this specification in the presence of two subscribing witnesses.

WILLIAM LEWIS DISMUKES.

Witnesses:
I. B. LOVE,
J. A. STEBBINS.